United States Patent [19]

Vlad et al.

[11] 4,378,160

[45] Mar. 29, 1983

[54] METHOD AND APPARATUS FOR DIAL INDICATORS CALIBRATION

[75] Inventors: Valentin Vlad; Nicolae Miron; Dan Sporea; Jean Maurer, all of Bucharest; Victor Bizu, Judetul Vilcea; Mihai Petre; Viorel Baicu, both of Bucharest, all of Romania

[73] Assignee: Intreprinderea de Mecanica Fina, Bucharest, Romania

[21] Appl. No.: 159,652

[22] Filed: Jun. 16, 1980

[30] Foreign Application Priority Data

Apr. 24, 1976 [RO] Romania .................................. 85781

[51] Int. Cl.$^3$ ............................................. G01B 11/02
[52] U.S. Cl. .................................................. 356/358
[58] Field of Search .................... 356/358; 250/231 R, 250/231 SE

[56] References Cited

U.S. PATENT DOCUMENTS 3,486,824 12/1969 Cook et al. ........................... 356/358

FOREIGN PATENT DOCUMENTS 2132286 1/1972 Fed. Rep. of Germany ...... 356/358

OTHER PUBLICATIONS

Domareva et al., "Laser Interferometer for Scales," Izmeritel'naya Tekhnika, #11, pp. 51-53, 11/75.

Primary Examiner—John K. Corbin
Assistant Examiner—Matthew W. Koren
Attorney, Agent, or Firm—Karl F. Ross

[57] ABSTRACT

A method and an apparatus for dial indicator calibration comparing the real displacement of the dial indicator rod with its ideal linear displacement during each calibration interval given by the dial indicator hand, having a Michelson interferometer with a laser as a linear displacement transducer, an opto-electronic transducer to read the dial, indicator hand position for each calibration interval, an electronic control urgent which controls the operation of the whole apparatus and feeds to a printer the measuring errors in length units and the corresponding calibration intervals.

5 Claims, 1 Drawing Figure

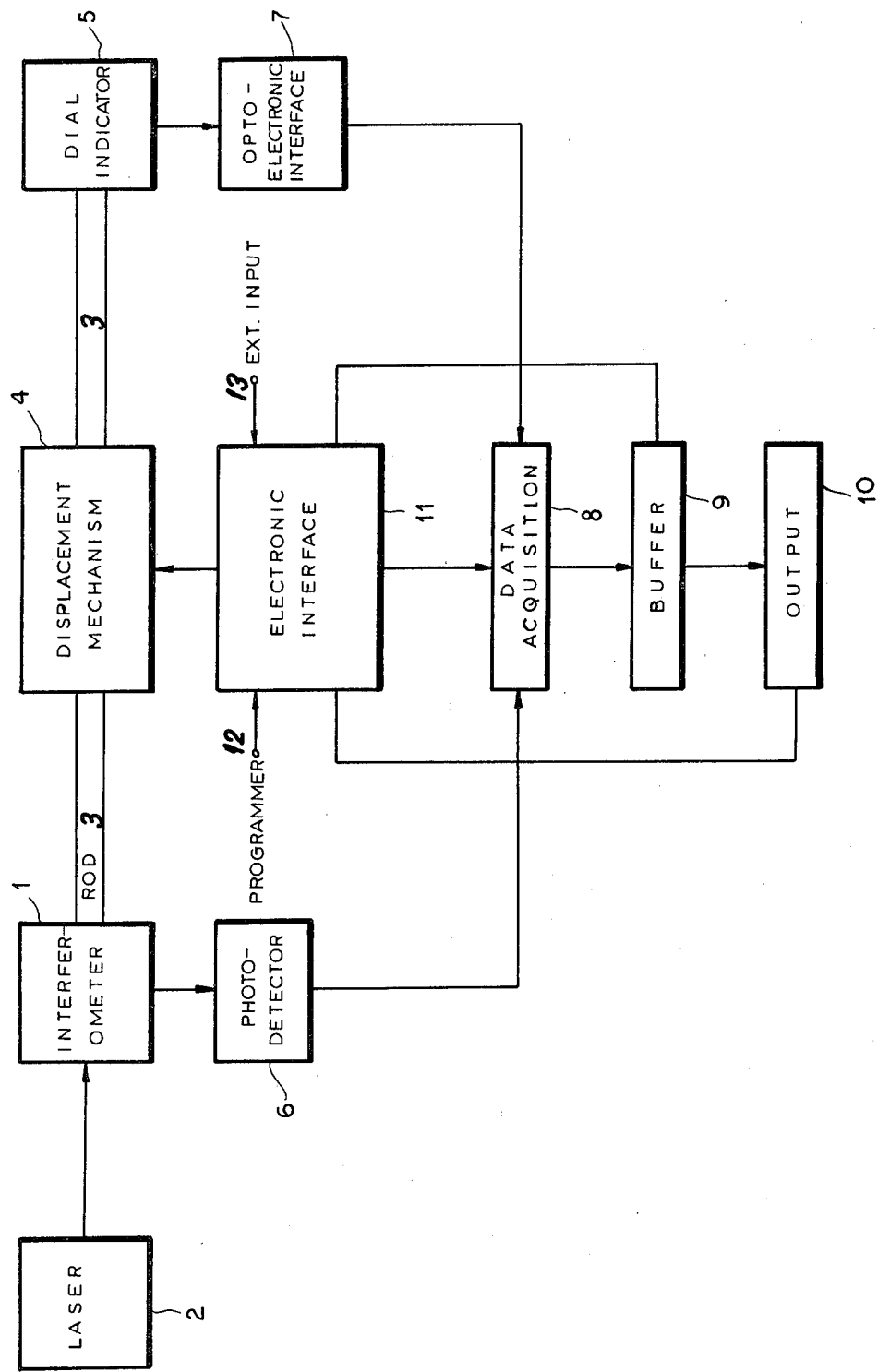

METHOD AND APPARATUS FOR DIAL INDICATORS CALIBRATION

FIELD OF THE INVENTION

The present invention relates a method of and an apparatus for dial indicator calibration, by measuring the errors between the ideal and the real linear displacements of a dial indicator rod corresponding to each calibration interval.

BACKGROUND OF THE INVENTION

There have been many static methods for dial indicator calibration using gage blocks, sine-bar and mechanical and/or optical mechanical displacement amplifying systems (see Patent Nr.24 26 156 West-Germany).

All of these calibration devices have a holder fixing the body of the dial indicator under calibration, the rod end of the dial indicator being held in contact with a linear displacement device. The operator reads the result of the measurement pointed by the dial indicator hand and compares it with the linear calibrated displacement of its rod imposed by the displacement device.

The difference between the two readings represents the error of the dial indicator for the corresponding calibration interval.

These methods have some drawbacks. They use a mechanical length standards, (like gage blocks, micrometric displacement, etc.), which is sensitive to temperature variation and aging, they are cumbersome and time consuming and the results are affected by operator errors in reading the dial indicator hand position corresponding to the rod displacement, and the calibration is performed over a small number of calibration intervals. The dial indicator rod is always in contact with the length standard during the entire calibration process, leading to deterioration of the latter.

OBJECT OF THE INVENTION

It is the object of the invention to provide an improved method of and apparatus for dial indicator calibration.

SUMMARY OF THE INVENTION

This object is attained with a method of and an apparatus for dial indicator calibration which avoids the above mentioned disadvantages so as to improve precision and eliminates operator subjectivity on calibration, by using a laser dynamic interferometric method as a linear displacement transducer, which yields data which is compared with an permanently memorized information representing the ideal linear displacement of comparator rod for each calibration interval, the comparison being done at time intervals given by an opto-electronic transducer, working without any focusing optics, having a photodetection matrix array, giving an electric pulse at the coincidence between dial indicator hand and each gradution, and being applied as a mask on the face of the dial indicator to be calibrated. The calibration instrument is a Michelson interferometer with a laser as a coherent monochromatic light source which has a wavelength used as a length standard which senses the linear displacement of a rod on a direction of an interferometer arm, the rod being moved by a forward-backward translation mechanism with adjustable displacement range governing the rod movement of the fixed dial indicator to be calibrated, a photodetection system dectecting interference fringes, an optoelectronic interface used as an angular transducer to sense dial indicator hand angular displacement, an acquisition system of data from the photodetection system and opto-electronic interface, a buffer memory, a peripheral device, a programmer, and two external commands: initialization of the apparatus and start of measurement, the entire instrument being mounted on a shock and vibration resistance frame.

BRIEF DESCRIPTION OF THE DRAWING

The sole FIGURE of the drawing is a block diagram of an instrument for dial indicator calibration

SPECIFIC DESCRIPTION

A Michelson interferometer 1, having a laser 2 as a coherent light source is main optical part of the instrument. One of the two interferometer retroreflectors is mounted at the end of a rod 3, linearly moved in direction of the incident light beam by a displacement mechanism 4. The other retroreflector is held fixed. The interference fringes produced by the interferometer 1 upon the rod displacement 3 are scanned by the photodetector. The number of fringes passing through a fixed point of photodetector surface is proportional to the linear displacement of the rod 3. Half fringe displacement of the interference pattern, i.e. when an interference maximum replaces a minimum, corresponds to a displacement of a quarter of laser radiation wave length, considered as a length standard. In this manner, the linear displacement of the rod 3 can be measured by an integral number of quarter wavelength. Fringe displacement given by the interferometer 1 is sensed by a photodetection system 6 which produces a standard electric signal for each detected half-fringe.

According to the standards, there were established adjacent calibration intervals on dial indicator face, so that the beginning of the "n+1" interval is coincident with the end of the "n" interval. The instrument described according to the present invention performs the measurement of dial indicator rod displacement corresponding to the angular displacement of dial indicator hand in each calibration interval and points to the error between measured linear displacement and internally memorized etalon corresponding to the ideal linear displacement of the rod in each calibration interval. An optoelectronic interface 7 with a photodetection matrix array containing photodetectors in the same positions as dial indicator calibration graduations, giving a slow time-varying electric signal with the same period as the time needed for dial indicator hand to pass between two successive calibration graduations, gives a standard electric signal at each coincidence between dial indicator hand position and calibration graduation. Electric signals coming from the photodetection system 6 and from the opto-electronic interface 7 are fed a data acquisition system 8. Each pulse given by the interface 7 loads the data acquisition system 8 with a number equal to the number of fringes coresponding to the ideal linear displacement of the dial indicator rod in the calibrating interval. Immediately after this loading, the acquisition system 8 receives pulses coming from the photodetection system 6 until the next load signal coming from interface 7 is received.

The difference between the number loaded in the acquisition system 8 and the number of pulses coming from the photodetection system 6 and received by the acquisition system 8 represents the error between the real and ideal linear displacement of dial indicator rod. The acquisition system 8 holds also the position of the calibration interval. The size and sign of the determined error and the position of each calibration interval are transferred to a buffer memory 9. Data loaded in buffer memory 9 are transferred to an output peripheral device 10, giving the calibration results in alphanumeric or graphic form via an electronic interface 11, which assembles the printing format containing the sign for the overflow of the preset error limit, the error size between the measured displacement and the memorized standard, the position of the calibration interval, the direction of dial indicator rod movement and the error sign. The peripheral device can be a printer, an alphanumeric display or an x-y recorder associated with a digital to analog converter. A programmer 12 controls the real-time operation of the entire apparatus and allows its external control by two commands.

An external command, implemented by a known device 13 given to the programmer 12 sets the whole apparatus in the initial state and gets it ready for measurement. For fixing the accuracy range of the dial indicator under calibration, one can select with the external command 13 a maximum value of the error size in absolute value so as in the result displayed by the peripheral device 10 appears also a sign for overflow of the preset maximum value of the error. The command given to the programmer 12 starts the measurement. After this command, the programmer 12 controls the movement of the rod 3 with the electro-mechanical device 4 for forward and backward directions, memorizes the displacement direction and stops the apparatus operation after a complete forward backward cycle of the rod 3. Furthermore, the programmer 12 controls the loading of data acquisition system 8, the transfer of the result from data acquisition system 8 into buffer memory 9 and the operation of the output peripheral device 10 in synchronism with the electric signals given by the opto-electronic interface 7.

The translation mechanism 4 moving the rod 3 is designed so that the vibration amplitude transmitted to the rod 3 is less than a quarter wavelength of the monochromatic radiation used in the interferometer 1. Moreover the assembly composed by the optical device 1, the laser 2, the rod 3 and the translation mechanism 4 is designed to be insensitive to external vibrations.

The advantages of the present method and of the present apparatus for dial indicator calibration are the following:

it provides a highly accurate method, in the order of tenth of micrometer; and it is fully automatic and avoids any operator errors.

We claim:

1. A method of calibrating a dial indicator which comprises the steps of:
   (a) automatically generating a succession of pulses representing the displacement of a dial indicator pointer resulting from the displacement of a rod thereof;
   (b) displacing said rod back and forth over a calibration interval;
   (c) interferometrically measuring the displacement of said rod and generating a plurality of pulses representing the displacement thereof;
   (d) comparing the pulses produced in steps (a) and (c) and generating the signal representing a difference between the reading of said pointer and the displacement of said rod;
   (e) storing said signal; and
   (f) displaying the stored signal.

2. The method defined in claim 1 wherein, in step (a), a photodetection metric array is applied as a mesh to the face of said dial indicator and the pulses of step (a) are generated upon coincidence of the pointer with signal-generating elements of said array.

3. An apparatus for the calibration of a dial indicator comprising:
   (a) a photodetection matrix array applicable as a mesh to the face of a dial indicator to be calibrated and having signal-generating elements located at calibrations of said face for producing pulses upon coincidence of the dial indicator pointer with said calibrations;
   (b) means for moving a rod of said indicator back and forth linearly, thereby swinging said pointer;
   (c) a Michelson interferometer having a laser sensing the linear displacement of said rod, an interference fringe photodetection system producing pulses representing the actual displacement of said rod;
   (d) a data acquisition unit for comparing the pulses from said interferometer and from said matrix and producing a difference signal representing divisions of measured linear displacement from ideal linear displacement by a calibration interval determined by the back-and-forth displacement of said rod;
   (e) means for storing said difference signal; and
   (f) means for displaying calibration error and responsive to the stored signal.

4. The apparatus defined in claim 3, further comprising means for indicating the sign of said deviation as the sign of said error signal.

5. The apparatus defined in claim 3, further comprising means for comparing said signal with an absolute value of error established by an external command for indicating any excess of the measured error over the absolute value.

* * * * *